Nov. 10, 1959  S. G. THOMSON, JR  2,911,868
CONTROL APPARATUS FOR MACHINE TOOLS OR THE LIKE
Filed Sept. 19, 1955  2 Sheets-Sheet 1

INVENTOR.
SAMUEL G. THOMSON, JR.
BY John C. McGregor

Nov. 10, 1959   S. G. THOMSON, JR   2,911,868
CONTROL APPARATUS FOR MACHINE TOOLS OR THE LIKE
Filed Sept. 19, 1955   2 Sheets-Sheet 2
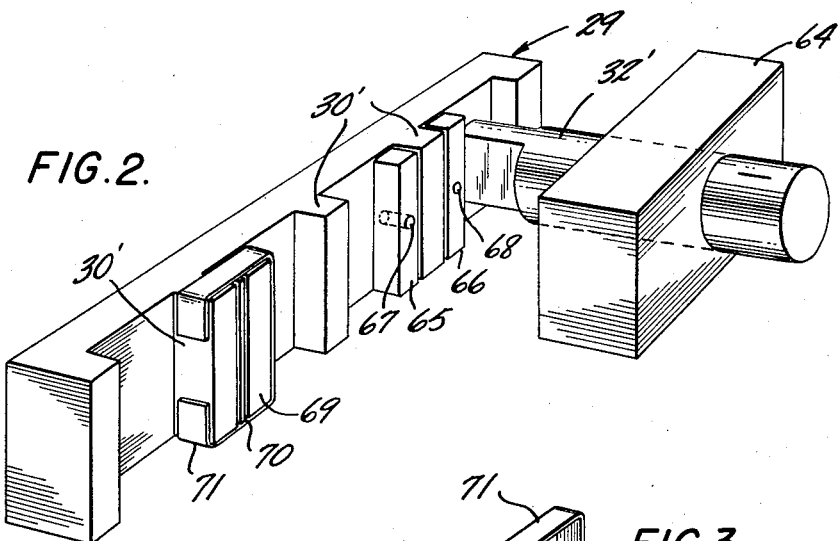
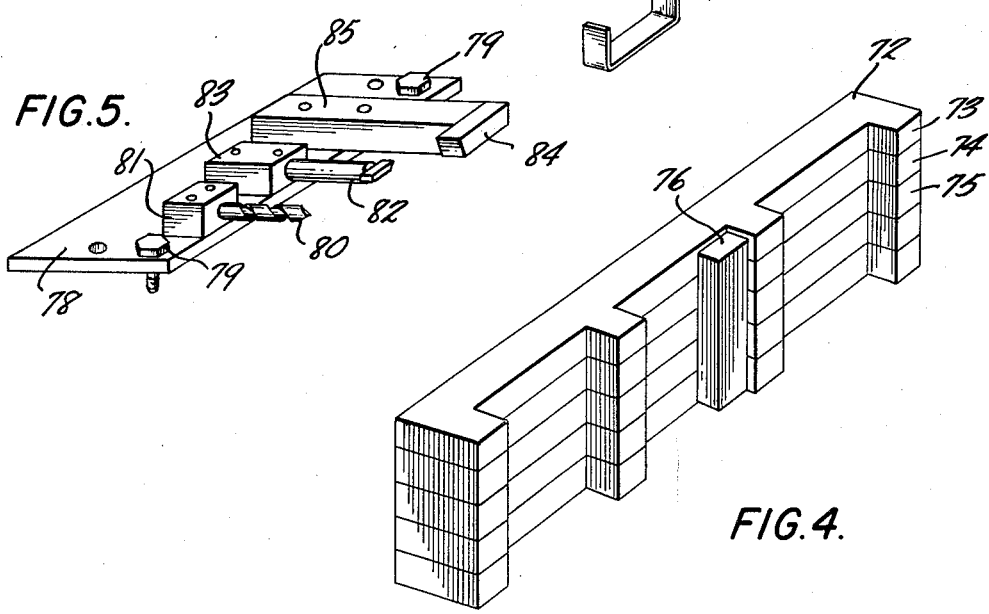
INVENTOR.
SAMUEL G. THOMSON, JR.

United States Patent Office 2,911,868
Patented Nov. 10, 1959

2,911,868

CONTROL APPARATUS FOR MACHINE TOOLS OR THE LIKE

Samuel G. Thomson, Jr., Plandome Manor, N.Y., assignor to Thomson Automatics, Inc., Mineola, N.Y., a corporation of New York Application September 19, 1955, Serial No. 535,046

4 Claims. (Cl. 82—2)

This invention relates to the control of machine tools or the like and more particularly to apparatus for providing speed and direction changes to the moving parts thereof.

In the operation of machine tools, such for example as, drill presses, lathes, or the like, it is often desirable to assist the operator in various ways to turn out error-free work within close tolerances. To this end, machine tols are commonly furnished with control devices such as stops and gauges which, when properly positioned, arrest at a desired point the motion of a slide or of a carriage moving along a way. It is costly and often impractical, however, to provide control devices which afford all possible stop points along the travel of a slide. Moreover, conventional control devices are often complicated to an extent which results in long set-up periods for a machine.

Accordingly, it is an object of this invention to provide adjustable control means for use in controlling the direction and limits of travel of the slides of machine tools or the like.

Another object of the invention is to provide means for obtaining actuating signals from any desired points of the travel of a slide along its way.

Another object of the invention is to provide control devices for use in machine tools which afford a wide range of settings with greater simplicity and at lower cost of construction.

Another object of the invention is to provide an adjustable automatic sequence control system for machine tool slides and moving members tools by means of which predetermined operations can be carried out on the work without requiring the constant attention of the operator.

Yet another object of the invention is to provide new and simplified control devices for machine tools which are readily interchangeable and which can be stored for reuse at another time.

These and other objects and features are attained by means of machine tool apparatus formed in accordance with the present invention, preferred embodiments of which are described below, having reference to the accompanying drawings in which:

Figure 2 is a view in perspective of a stop mechanism adapted to afford a wide range of settings and which is used in conjunction with the adjustable control means;

Figure 3 is a view in perspective of a clip member adapted to be used in conjunction with the adjustable stop mechanism of Figure 2;

Figure 4 is a view in perspective of a modified form of stop mechanism; and

Figure 5 is a view in perspective of a battery of cutting tools capable of use in the machine tool of Figure 1 for performing a sequence of machine operations on a work piece.

Figure 1:
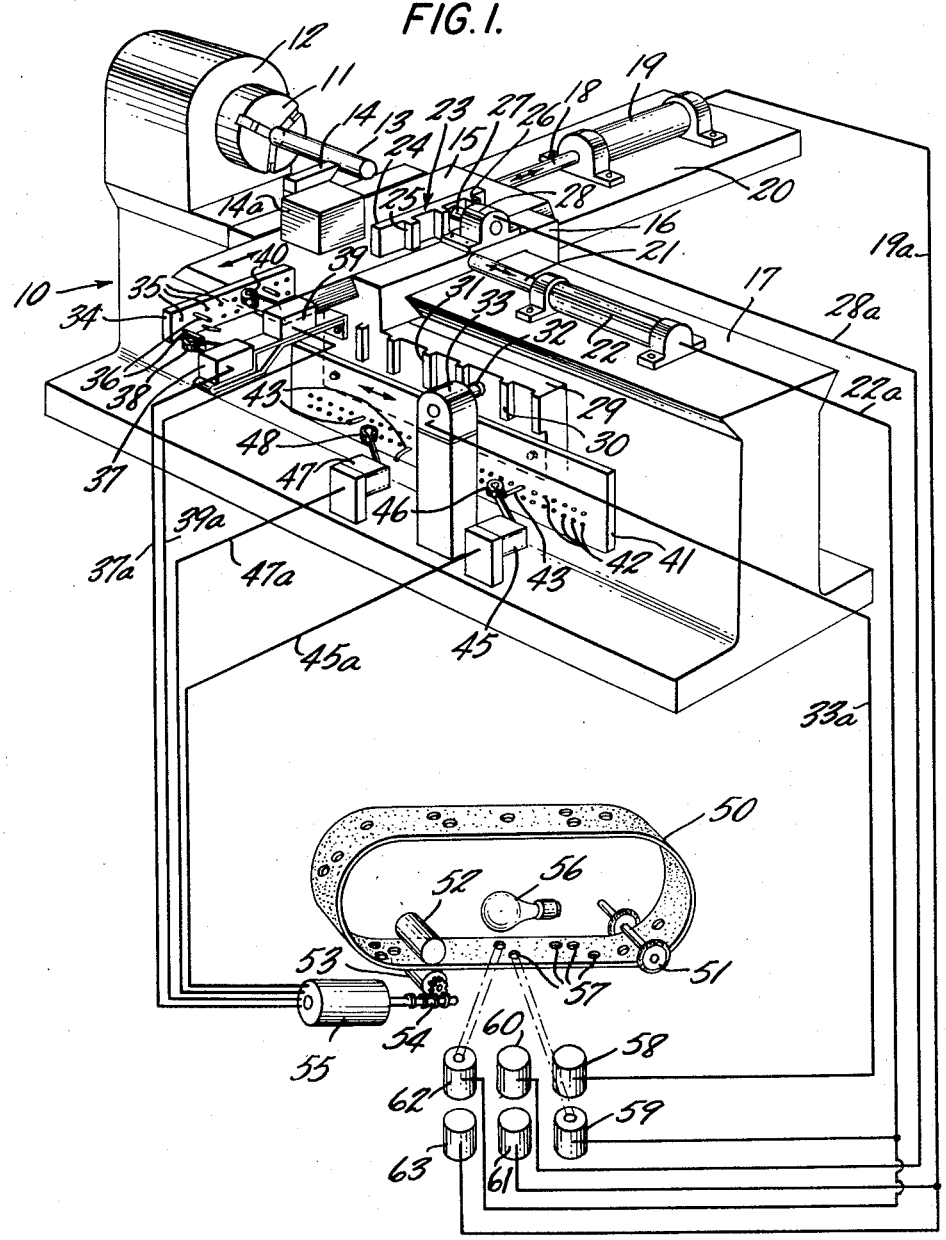
Figure 1 is a view in perspective, partly diagrammatic in nature, of a machine tool having adjustable control means and an automatic program and control system associated therewith.

Referring to Figure 1, the invention is illustrated as embodied in members of a machine tool which can take the form for example, of a lathe indicated generally by the numeral 10 and including a chuck 11 driven by suitable motive means 12. A work piece 13 is clamped in the jaws of the chuck to be operated on by a cutting tool 14 mounted in a suitable holder or block 14a of a transverse or cross slide 15 slidably mounted in ways 16. Said ways are also slidably mounted on a bed or way 17 of the lathe, thereby acting as a lathe carriage or longitudinal slide 16.

The transverse slide 15 can be moved by suitable means such as a hydraulic jack including a piston rod 18 and a cylinder 19 mounted on an extension 20 of the longitudinal slide 16. The slide 16 can in turn be controlled longitudinally in its motion by means of a hydraulic jack including a piston rod 21 and a cylinder 22 mounted on the way 17. It will be understood that suitable actuation of the jacks can cause the cutting tool 14 to partake of conventional rectilinear motions relative to the turning work piece 13.

The extent of motion, i.e., the depth of cut, of the transverse slide 15 can be controlled by a control piece indicated generally by the numeral 23 including a body portion in the form of an upstanding plate 24 detachably secured to the transverse slide 15 and carrying on one of its vertical faces a series of offset portions which can take the form of shoulders 25 and 26. Mounted on the longitudinal slide 16, which also comprises the ways for the cross slide 15, and adjacent the plate 24 is a complementary plunger 27 movably mounted in a housing 28 to be selectively interposed in the path of travel of the shoulders of the plate, thereby to arrest the motion of the slide 15. The plunger 27 can be controlled as by electromagnetic means for example, to arrest the motion of the slide at any desired point, consistent with the positioning of the shoulders 25 and 26 on the plate 24 in accordance with means described below.

Similarly, the motion of the longitudinal slide 16 can be controlled by means of a control piece comprising a plate 29 movable with the slide 16 and including on one of its faces a series of offset portions or shoulders such as those identified by the numerals 30 and 31. Disposed beside the plate 29 and affixed to the bed of the machine tool is a complementary plunger 32 movable in controlled motion toward and away from the plate 29 in a housing 33. The housings 28 and 33 can take the form of solenoid coils, and the plungers 27 and 32 solenoid cores, preferably spring biased toward one of their extremes and adapted to be disposed in positions either to be engaged by the shoulders or to permit them to pass.

Also mounted on the transverse slide 15 to move therewith is a second control piece which can take the form of a detachable plate 34 having formed in one of its surfaces an array of holes 35 adapted to receive offset means in the form of a series of deformable pins 36. The pins 36 are preferably formed of a flexible but firm material such as music wire so that they can be bent to cause their ends to be displaced by an amount up to the distance to the hole 35 next adjacent to that in which the pin is mounted, thereby to facilitate a wide range of settings. Mounted adjacent the plate 34 and complementary thereto, are a switch 37, having an actuating arm 38 and a switch 39 having an actuating arm 40, the two arms 38 and 40 being respectively interposed in the path of travel of the upper and lower row of pins 36.

Similarly, secured to move with the longitudinal slide 16 is a control piece including a detachable plate 41 having two rows of closely spaced holes 42 formed in one of its surfaces and adapted to receive a series of deformable pins 43 capable of being bent, in the manner of the pins 36, for a distance not less than the spacing of the hole next to that in which they are mounted. Mounted adjacent the plate 41 are a switch 45 having an actuator 46 and a switch 47 having an actuator 48, the actuators 46 and 48 being respectively interposed in the path of travel of the pins in the upper and lower rows 42 in the plate 41.

It will be observed that the plates 34 and 41 are readily detachable from the machine tool. Thus different sets of plates can be attached to achieve different control actions and they can be removed and stored for use when needed.

Under certain conditions it is desirable to control the operation of the slides of a machine through a series of operations automatically without the attention of the operator. This can be attained in accordance with the present invention by providing a programming device which can take the form for example, of information stored in code form on an endless belt 50 driven by suitable guide rollers 51, 52 and 53, the latter being driven through a worm and gear coupling 54 by electromagnetic means such as a motor 55. Assuming the coded information is stored in the form of perforations in the belt 50, a light source 56 is provided on one side of the belt to shine through the perforations 57 to impinge upon any one of a battery of photoelectric cells 58, 59, 60, 61, 62 or 63, each of which can bear a particular spacial relationship to the belt to receive light from a particular row of perforations. The several electrical switches 37, 39, 45 and 47, for example, can be connected respectively by conduits 37a, 39a, 45a and 47a to operate the electric motor 55 which turns rollers 52 and 53 until stopped as by a limit switch for example after one turn of the rollers to position the perforated belt 50 at a predetermined initial position. Figure 1 shows light passing from a source 56 through holes 57 to illuminate the photoelectric cells 59 and 62 which electrically operate relays and electrical valves of the cylinder 22 thereby causing oil to be admitted under pressure to drive the piston rod to move the slide 16.

The slide will move until the pin 43 closes the switch 47 by means of this actuating arm 48 and causes the motor 55 to drive the rollers 52 and 53 one complete turn before stopping the belt 50 at a second position, thereby interposing a different set of punched holes 57 between the source 56 and the photoelectric cells 58 and 60 which by means of relays and solenoid coils 33 and 28 electromagnetically operate plungers 32 and 27 into engagement with the control pieces 23 and 29. Thus, the pins 36 and 43 can be arranged in their respective plates 34 and 41 to index the belt 50 forwardly as predetermined slide positions are reached in the operation of the machine tool 10. The various actuations are obtained each time a pin 36 or 43 actuates a switch 39 or 45 and the accuracy of the point at which the actuation takes place is important. Adjustability is obtained by bending or deforming the pins to actuate switches at precisely the desired point. The pins may be accurately bent by means of a bending tool or wrench to provide fine adjustment of the point at which actuations take place.

An example is the forming of a given diameter on the work piece 13. The belt 50 may be perforated so that the cell 61 is illuminated to cause the relay and valve of the cylinder 19 to cause oil to flow in the cylinder in the direction to retract the piston rod 18. As the tool 14 approaches the desired depth of the cut, a pin 36 actuates a switch 39 through its arm 40 which causes the motor 55 to move the belt 50, as previously described, to the next position in which a hole 57 is so punched as to cause light from a lamp 56 to actuate photoelectric cell 63 which in turn actuates a relay and electric valve of cylinder 19 so as to cause oil to flow in the cylinder in the direction to expel the piston rod 18, thereby reversing the direction of travel of the slide 15 and moving the tool 14 away from the work. Bending or deforming the pin affords a means of adjusting the stopping point of the slide and the resulting diameter of the work. As the slide 15 continues in its reversed direction another pin 36 will actuate switch 37 through its actuating arm 38 which causes the belt 50 to be moved to the next position. The belt can be punched to stop the slide 15, stop the chuck 11, move slide 16 longitudinally, or to effect any other desired function.

The photoelectric cells 58 and 60 can be connected to the solenoids 28 and 33 by conduits 28a and 33a respectively to cause the plungers 27 and 32 to be interposed selectively in the path of their companion stop shoulders. The photoelectric cells 59 and 62 can be connected by conduit 22a to actuate the hydraulic jack of the cylinder 22 and the cells 61 and 63 by conduit 19a to the jack having the cylinder 19, thereby to drive the respective slides 15 and 16 to and fro in accordance with the coded information on the belt 50. Thus by setting up a proper programming cycle elaborate and complete machine operations can be carried out automatically on the workpiece 13. Referring to Figure 1, a typical semi-automatic operation of the machine tool, for simpler sequences, can be effected by connecting the switches 37, 39, 45, and 47 to magnetically actuate the plungers 27 and 32 into and out of engagement with the control pieces 23 and 29 and/or to actuate the hydraulic jacks 19 and 22. The machine operator could then, for example, cut a groove in work piece 13 by starting the slide 15 in motion so as to move the cutting tool 14 toward work piece 13' and into it until the pin 36 moves the actuator arm 40' to close the switch 39 which magnetically moves the plunger 27' into the path of a selected projection of the control piece 23' which, when the plunger 27 engages the projection of the piece 23, stops the slide 15 and the tool 14 at the desired depth of plunge cut. The pin 36 has been adjusted by bending or deforming so as to actuate the arm 40 and switch 39 at precisely the right time to engage the plunger 27 with the desired projection of piece 23. The operator may then reverse slide 15 to release the tool from the work, the size having been accomplished automatically.

Referring to Figure 2 there is shown a plate 29 having shoulders 30' adapted to be engaged selectively by an interposed plunger 32'. In accordance with the present invention, the stop positions can be varied by the addition of supplementary shoulders such as the pads 65 and 66 secured by fasteners 67 and 68 respectively to the plate 29 on either side of a shoulder 30'. Also in accordance with the invention, the stop position can be controlled by adding pads 69 and shims 70 to a shoulder 30' by means of a suitable spring clamp 71. The spring clamp and pads can, when it is desired to change them, simply be slid outwardly off of the shoulder. The aforementioned pins 36 (in Fig. 1) may be bent so as to cause plunger 32' to engage a desired shoulder 30' at just the right time.

Referring to Figure 4 there is shown a plate 72 comprising stacked laminations 73 and 75, etc., of magnetic material separated by suitable insulating sheets 74 to which pads 76 of magnetic material can be readily attached to control the stop positions of the machine tool.

Thus, it will be understood that in accordance with the present invention convenient and simple ways are provided for setting up machine tools quickly and inexpensively to perform desired operation sequences. It will be understood also that the invention can take other numerous forms and embodiments within the scope of this disclosure. Thus, for example, referring to Figure 5, the combination tool holder 78 can be bolted to the transverse slide 15 by fasteners 79 to bring a plurality of cutting tools into place sequentially. Thus, for example a drill 80 held in a block 81 and boring and turning tools 82 and 84 held in blocks 83 and 85, respectively, can be affixed to the plate 78, each to be brought into play in a desired programming sequence which can, if desired, be set up on a coded tape. The invention should not, therefore, be regarded as limited except as defined by the following claims.

I claim:

1. In a machine tool, first and second relatively movable members, said first member comprising a slide for supporting a cutting tool, and said second member comprising a way for guiding the first member, the invention comprising a control piece removably attached to the machine tool to move with the first member, said control piece carrying pin means having deformable shank portions extending outwardly therefrom, the shank positions being deformable by bending in the direction of travel of the member and capable of holding their deformed condition, motive means to effect relative movement of the first and second members, switch means to control said motive means, and actuators for said switch means mounted on the second member and interposed in the path of travel of said control piece as it moves with the first member to be engaged by deformable portions of said pin means.

2. A machine tool as set forth in claim 1, said control piece having formed therein a plurality of holes to selectively receive said pin means, each spaced from the next in the direction of travel of the member, the spacing being a function of the deformability of said pin means.

3. A machine tool as set forth in claim 1, including stop means for arresting relative movement between said first and second movable members comprising shoulders movable with the first member, plunger means mounted on the second member to selectively engage the shoulders of the first member to arrest the relative motion of the members, certain of said switch means being connected to actuate said plunger means to move the latter between engaging and non-engaging positions.

4. A machine tool as set forth in claim 1 including programming means to carry information for producing a desired cycle of operation, said programming means being interposed between said switch means and said motive means and including electromagnetic means controlled by said switch means, an information member containing the program of operation driven by said electromagnetic means, and sensing means controlled by said information member to actuate said motive means.

References Cited in the file of this patent

UNITED STATES PATENTS

| | | |
|---|---|---|
| 537,719 | Russell | Apr. 16, 1895 |
| 1,849,642 | Schenker | Mar. 15, 1932 |
| 2,032,598 | Shaw | Mar. 3, 1936 |
| 2,167,189 | Verderber | July 25, 1939 |
| 2,368,061 | Wortendyke | Jan. 23, 1945 |
| 2,423,440 | Neergaard | July 8, 1947 |
| 2,448,692 | Teetor | Sept. 7, 1948 |
| 2,537,770 | Livingston | Jan. 9, 1951 |
| 2,628,539 | Neergaard | Feb. 17, 1953 |
| 2,641,151 | Lee | June 9, 1953 |
| 2,656,497 | Schweighofer | Oct. 20, 1953 |
| 2,692,518 | Armitage | Oct. 26, 1954 |
| 2,720,129 | De Haas | Oct. 11, 1955 |
| 2,741,732 | Cunningham | Apr. 10, 1956 |